Feb. 25, 1936.  H. KÜPPENBENDER  2,032,060
PHOTOGRAPHIC CAMERA
Filed Sept. 19, 1934    2 Sheets-Sheet 2
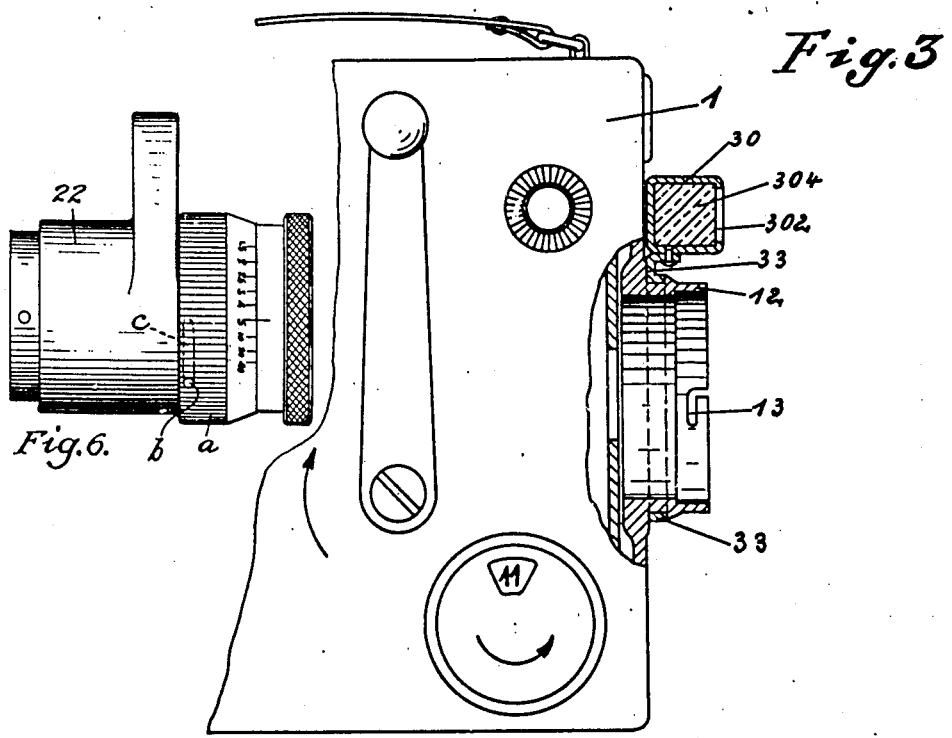
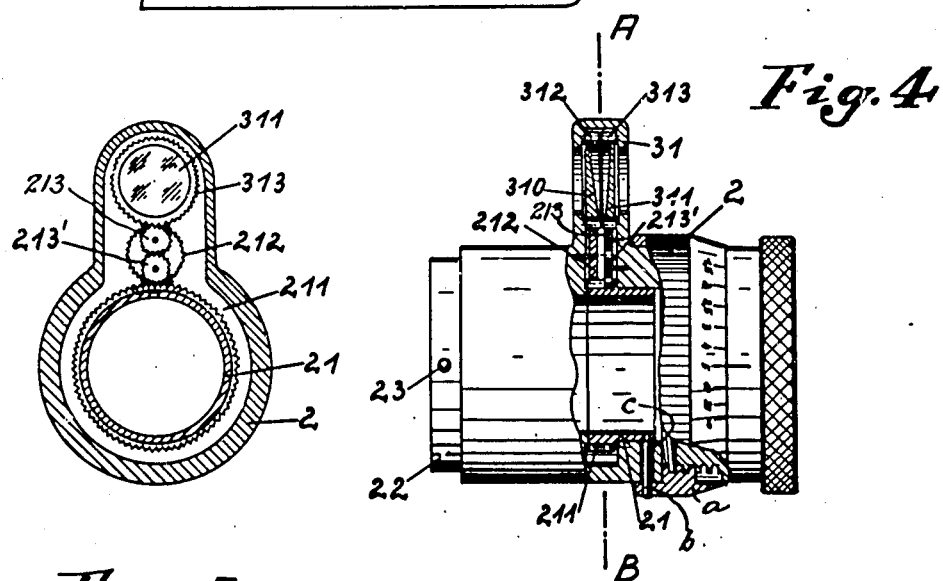

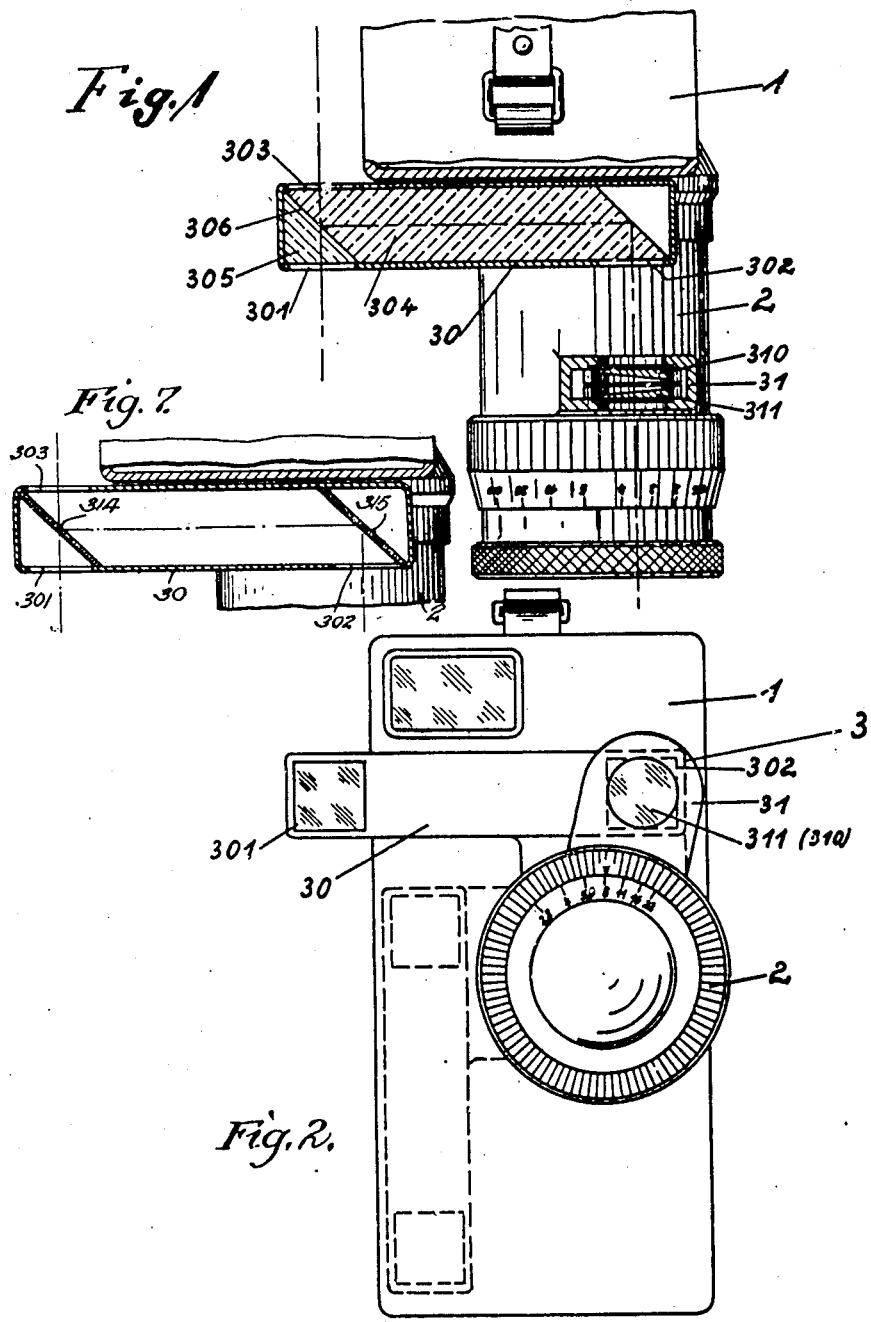

Patented Feb. 25, 1936

2,032,060

UNITED STATES PATENT OFFICE 2,032,060

PHOTOGRAPHIC CAMERA

Heinz Küppenbender, Dresden, Germany

Application September 19, 1934, Serial No. 744,623
In Germany September 22, 1933

9 Claims. (Cl. 95—44)

This invention relates to improvements in photographic and cinematographic cameras in which the regulation of the objective is effected simultaneously with the adjustment of a distance-meter of the home base type, especially of that kind using optical means separated from the base-line for deflecting the measuring light rays.

In the known apparatus of that type the arrangement forming the base-line is fixed to the camera-body while the ray deflecting member is coupled with the objective carrier.

Now it has come into fashion to use several objectives of different focal length for the same camera. It is, therefore, necessary to change the distance meter or at least the distance-scale together with the objectives. This change is of course often forgotten by the operator, whereby a lot of material, time and labor is wasted.

It is the object of the present invention to obviate this disadvantage by providing each objective with a device for deflecting the measuring rays commensurate with the focal length of the objective and attached firmly to the lens support so that it must be changed together with the objective.

The construction of the deflecting device must be so calculated, that the focussing of the objective is effected simultaneously with the adjustment of the distance-meter.

The present invention will be best understood by the following description and the annexed drawings.

In the accompanying drawings:

Fig. 1 is a top view of a camera with a distance-meter operated objective according to my invention, the distance-meter parts being shown in cross-section.

Fig. 2 is a front view thereof.

Fig. 3 is a side view of a camera according to the invention, several parts of which being broken away for illustrating better the inventive idea.

Fig. 4 is a side view of an objective according to my invention, several parts also being broken away for the sake of better understanding.

Fig. 5 is a front view of a cross-section following line A—B of the objective mounting, shown in Fig. 4.

Fig. 6 is a side view of the objective, same as Fig. 4, and illustrates the rotability of the focussing mounting, and Fig. 7 shows a modified embodiment of the invention.

As illustrated, the camera 1 in the form of a cinematographic camera of the spring motor driven type carries the lens tube 2 and the distance-meter 3. This distance-meter consists of two parts separated from one another.

The part 30 forming the base is fastened to the camera-body and consists of a box-like casing containing two mirrors or total reflecting prisms for collecting the rays coming from the object to be photographed. In the embodiment shown in Fig. 1 the casing has two outlooks 301 and 302 in front and a peephole 303 in the back. Two prisms 304 and 305 are positioned inside the casing in such manner that the rays entering the opening 302 are reflected twice by the prismatic body 304 to the operator's eye. The rays entering the opening 301 first pass prism 305, further prism 304 and also reach the operator's eye. For better combining both pictures, the contacting plane 306 of the prisms 304 and 305 is half-silvered.

The part 31 of the distance-meter forms the ray deflecting device and consists, in the embodiment shown in Figs. 1 and 4, of two glass wedges 310 and 311 arranged in a box-like casing so as to be rotatable counter one another and in relation to the objective position. For this purpose the objective-focussing mounting 21 carries a gear 211 meshing with a gear 212 in turn engaging the gear 312 on the mounting which carries the glass wedge 310. The gear 211 meshes also with a gear 213' which engages the gear 213 and the latter meshes with a gear 313 on the mounting of the glass wedge 311. The focussing mounting 21 is rotatably mounted in a sleeve 22 and is connected by a pin b with an adjusting ring a provided with a screw thread, by which in known manner, the rotating movement of the adjusting ring a is changed into a to-and-fro movement of the objective itself. The pin b extends through a circumferential slot c in said sleeve 22 to permit this rotation of the mounting 21 by the adjusting ring a.

By the preceding description, it will be apparent that, on rotating the objective mounting, the glass wedges 310 and 311 will be rotated in opposite directions and upon such rotation being effected, the measuring ray experiences a deflection in one direction only, because on account of the oppositely directed rotation of the wedges, the deflection perpendicular to that said direction is eliminated.

Fig. 7 shows a modified embodiment of the invention, in which two mirrors 314 and 315 are used in place of the two prisms 304 and 305. The mirror 315 is densely silvered so that the rays entering the opening 302 are directly reflected to the mirror 314 which is only slightly silvered to be semi-transparent. The mirror 314 reflects the rays coming from the mirror 315 into the opening 303 and into the eye of the observer, and owing to the transparency of the mirror 314 it is also penetrated by rays entering the opening 301 and leaving the opening 303.

As already mentioned, the measuring ray deflecting device must be so constructed that, by looking through the peephole of the base, the operator has nothing to do but to bring both pictures seen in the telemeter in superposition by turning the focussing mounting, whereby the object to be photographed is focussed at the same time. This can be effected by suitably choosing the angle of the glass wedges or the rate of the gears or the pitch of the screw thread or of the curved slot. In this manner, each objective can be provided with a ray deflecting device, commensurate to its focal length which will be firmly attached to or form a part of the lens mounting so that by changing one objective the ray deflecting device will be automatically changed.

The objective mounting may be fastened to the camera body in any known manner. In the embodiment shown in Figs. 3 and 4, the sleeve 22 of the objective mounting fits snugly into the tube-like opening 12 of the camera front wall and is fastened by pin 23 entering slot 13, when turning the lens mounting.

As already mentioned, the base-casing may be fixedly attached to the camera body. Or, for sake of convenience, it may be rotatably attached to the camera body in such a manner, that it may be swung away, if it will not be in use.

As is shown in Figs. 2 and 3, the base-casing 30 may be fastened to an annular member 33 rotatably fixed to the lens supporting ring 12 of the camera body, so that it may be swung down to the position shown in Fig. 2 in dotted lines.

It will be understood, that in the foregoing description the inventive idea is only shown in one preferred embodiment and that I do not like to be limited to the shown example, all changes in its general arrangement falling within the scope of the annexed claims.

Having thus described my invention, what I claim as new and desire to secure by Letters Patent is:

1. A camera, an objective mounting detachably fastened to it and a telemeter of the home-base type consisting of the ray collecting device separated from the ray deflecting device, said ray collecting device being attached to the camera body and said ray deflecting device being attached to the objective mounting.

2. A camera, an objective mounting detachably fastened to it and a telemeter of the home-base type consisting of the ray collecting device separated from the ray deflecting device, said ray collecting device consisting of two prisms rigidly mounted in a case attached to the camera body, and said ray deflecting device being attached to the camera body.

3. A camera, an objective mounting detachably fastened to it and a telemeter of the home base type consisting of the ray collecting device separated from the ray deflecting device, said ray collecting device being attached to the camera body, and said ray deflecting device consisting of two glass wedges rotatable counter one another and being turned by the lens mounting, said ray deflecting device being attached to the objective mounting.

4. A camera, an objective mounting detachably fastened to it and a telemeter of the home base type consisting of the ray collecting device separated from the ray deflecting device, said ray collecting device consisting of two prisms rigidly mounted in a case attached to the camera body, and said ray deflecting device consisting of two glass wedges rotatable counter one another and being turned by the lens mounting, and being attached to the objective mounting.

5. A camera, an objective mounting detachably fastened to it and a telemeter of the home base type consisting of the ray collecting device separated from the ray deflecting device, said ray collecting device consisting of a prism of rhombical shape and a second prism fixed to it, both prisms rigidly mounted in a case attached to the camera body, and said ray deflecting device being attached to the objective mounting.

6. A camera, an objective mounting detachably fastened to it and a telemeter of the home base type consisting of the ray collecting base separated from the ray deflecting device, said ray collecting base consisting of a prism of rhombical shape and a second prism fixed to it, both prisms rigidly mounted in a case, said case being attached to the camera body, and said ray deflecting device consisting of two glass wedges rotatable counter one another and being turned by the lens mounting, said ray deflecting device being attached to the objective mounting.

7. A camera, an objective mounting detachably fastened to it and a telemeter of the home base type consisting of the ray collecting device separated from the ray deflecting device, said ray collecting device being turnably attached to the camera body, and said ray deflecting device being attached to the objective mounting.

8. A camera, an objective mounting detachably fastened to it and a telemeter of the home-base type consisting of the ray collecting device separated from the ray deflecting device, said ray collecting device consisting of two mirrors rigidly mounted in a case attached to the camera body.

9. A camera, an objective mounting detachably fastened to it and a telemeter of the home base type consisting of the ray collecting device separated from the ray deflecting device, said ray collecting device consisting of two mirrors rigidly mounted in a case attached to the camera body, and said ray deflecting device consisting of two glass wedges rotatable counter one another and being attached to the objective mounting.

HEINZ KÜPPENBENDER.

Certificate of Correction

Patent No. 2,032,060.  February 25, 1936.

HEINZ KÜPPENBENDER

It is hereby certified that error appears in the printed specification of the above numbered patent requiring correction as follows: Page 2, first column, line 64, claim 2, for "camera body" read *objective mounting*; and that the said Letters Patent should be read with this correction therein that the same may conform to the record of the case in the Patent Office.

Signed and sealed this 13th day of July, A. D. 1937.

[SEAL]

HENRY VAN ARSDALE,
*Acting Commissioner of Patents.*